US010751816B2

(12) United States Patent
Rodriguez

(10) Patent No.: US 10,751,816 B2
(45) Date of Patent: Aug. 25, 2020

(54) PROTECTIVE COOLING COVER FOR CUTTER DISCS

(71) Applicant: GERMANS BOADA, S.A., Rubi (Barcelona) (ES)

(72) Inventor: Daniel Rodriguez, Rubi (ES)

(73) Assignee: GERMANS BOADA, S.A., Barcelona (ES)

( * ) Notice: Subject to any disclaimer, the term of this patent is extended or adjusted under 35 U.S.C. 154(b) by 36 days.

(21) Appl. No.: 16/042,886

(22) Filed: Jul. 23, 2018

(65) Prior Publication Data

US 2018/0326515 A1 Nov. 15, 2018

Related U.S. Application Data

(63) Continuation-in-part of application No. 15/431,999, filed on Feb. 14, 2017, now abandoned.

(30) Foreign Application Priority Data

Feb. 17, 2016 (ES) .................................. 201630180

(51) Int. Cl.
| | | |
|---|---|---|
| *B23D 59/02* | (2006.01) | |
| *B23Q 11/10* | (2006.01) | |
| *B24B 55/04* | (2006.01) | |
| *B23Q 11/06* | (2006.01) | |
| *B28D 1/04* | (2006.01) | |
| *B23Q 11/08* | (2006.01) | |
| *B27G 19/02* | (2006.01) | |

(52) U.S. Cl.
CPC .............. *B23D 59/02* (2013.01); *B23Q 11/06* (2013.01); *B23Q 11/1023* (2013.01); *B24B 55/045* (2013.01); *B23Q 11/08* (2013.01); *B27G 19/02* (2013.01); *B28D 1/04* (2013.01)

(58) Field of Classification Search
CPC ........ B23D 59/02; B23Q 11/06; B23Q 11/08; B23Q 11/1023; B24B 55/045; B27G 19/02; B28D 1/04
See application file for complete search history.

(56) References Cited

U.S. PATENT DOCUMENTS

| 992,490 A | * | 5/1911 | Fergusson | .............. | B23D 59/02 |
| | | | | | 83/169 |
| 3,330,517 A | * | 7/1967 | Zimmermann | ......... | A47F 5/103 |
| | | | | | 248/62 |

(Continued)

*Primary Examiner* — Stephen Choi
(74) *Attorney, Agent, or Firm* — Hill Wallack LLP; Jason L DeFrancesco

(57) ABSTRACT

The protective cooling cover comprises a hollow shell defining a generally semi-cylindrical cavity (15) that covers a portion of a cutting disc (2) at the top thereof and that is delimited by two lateral walls (11, 12) and a curved perimeter wall (13), a cooling device including a tube connected to a cooling liquid supply and to a cooling liquid projecting nozzle (31), and a fastening device for fixing the cooling liquid projecting nozzle (31) at different positions within the cavity (15) of the shell for projecting cooling liquid to different areas of the cutting disc, the fastening device including a plurality of first fasteners (17) connected to the periphery of the cavity, and a second fastener (32) connected to the cooling liquid projecting nozzle (31), the first and second fasteners (17, 32) providing a snap fit releasable connection.

9 Claims, 3 Drawing Sheets

(56) References Cited

U.S. PATENT DOCUMENTS

| | | | |
|---|---|---|---|
| 6,916,236 B2 * | 7/2005 | Terpstra | B23Q 11/0046 451/358 |
| 8,347,871 B2 * | 1/2013 | Irvine | B28D 7/02 125/13.01 |
| 2009/0277315 A1 * | 11/2009 | Ipatenco | B28D 1/047 83/171 |

* cited by examiner

PROTECTIVE COOLING COVER FOR CUTTER DISCS

OBJECT OF THE INVENTION

The object of the invention is a protective cooling cover for cutter discs, and which comprises a shell including a generally semi-cylindrical cavity that covers a portion of the cutting disc at the top, and that is delimited by two lateral walls provided with facing extensions that make up a curved perimeter wall.

This protective cooling cover has characteristics intended to enable the positioning of a cooling device, including a tube fed with cooling liquid from a cooling liquid supply and connected to a cooling liquid projecting nozzle, in several positions to dispense the cooling liquid on the cutting disc and to redirect the cooling liquid projected by said cutting disc during its rotation movement towards the cutting disc lateral sides.

FIELD OF APPLICATION OF THE INVENTION

This invention is applicable in cutter discs and especially, although by no means limited to, in cutter discs for construction materials.

STATE OF THE ART

Currently, cutter discs actuated by a motor and provided with a protective cover or lid which defines a cavity with a generally semi-cylindrical configuration intended to cover a portion of the periphery of the disc for safety reasons, leaving a portion of the disc uncovered in a cutting area, are widely known.

The incorporation of cooling device for the disc in this type of cutter discs is also known, consisting in a supply tube for a cooling liquid, usually water, which pours said cooling liquid on an area of the lateral surface of the disc close to its periphery.

In the known prior art of cutters, this tube is maintained in a fixed position with respect to the cutter disc, the cutter disc cooling varying significantly depending on the available flow rate of liquid, which could cause said cooling to become insufficient.

Another disadvantage of these cooling devices is that the cooling liquid that comes into contact with the cutting disc is rapidly projected against a curved perimeter wall of the cover, due to the centrifugal force created as the cutting disc rotates; the cooling liquid leaving the inner cavity of the cover practically without touching the disc and consequently creating significant waste in the cooling capacity of the liquid used.

DESCRIPTION OF THE INVENTION

The protective cooling cover for cutter discs comprises:

a shell defining a generally semi-cylindrical cavity that covers a portion of a cutting disc about its top and is delimited by two lateral walls and a curved perimeter wall;

a cooling device including a tube, fed with cooling liquid from a cooling liquid supply, and connected to a cooling liquid projecting nozzle;

a fastening device including a plurality of first fasteners connected to the lateral walls and/or to the curved perimeter wall and comprised within said cavity, in different positions around its periphery, and at least one second fastener connected to the cooling liquid projecting nozzle, said second fastener being complementary and attachable to any of the first fasteners, being the cooling liquid projecting nozzle fixable in any of said different positions around the periphery of the cavity directing the cooling liquid projecting nozzle towards the cutting disc.

The construction peculiarities described above are aimed at satisfactorily resolving the problem set forth, and more specifically, enabling the arrangement of the tube and the cooling liquid projecting nozzle in different positions with respect to the cutting disc.

The cooling liquid projecting nozzle has a second fastener which can be attached or released from any of a plurality of first fasteners distributed within the shell, in its inner perimeter area, preferably following an arch path out of range of the cutter disc, for example parallel to the curved perimeter wall, so that the cooling liquid projecting nozzle can be positioned in the most desired position, depending on the type of material to be cut or depending on the type of cutting blade used or depending on the velocity of the cutting blade. Each first fastener defines an attachment position where the cooling liquid projection nozzle can be attached directing the cooling liquid towards a different area of the rotative cutting blade.

The first fasteners and the second fasteners are preferably snap clips.

The studies carried out have confirmed that the disc cools better in situations with a low flow rate if the cooling liquid is projected from above, and in situations with a high flow rate if the cooling liquid is sprayed in a horizontal position, thus the mentioned characteristic enables the cooling of the cutting disc to be optimized by varying the position of the cooling liquid projecting nozzle depending on the available flow.

The preferred positions of the cooling liquid projecting nozzle are between: an upper position from which the liquid is projected on the upper area of the cutting disc, for example when there is a low flow rate, and a lower position, for example when there is a higher flow rate of cooling liquid.

Another relevant characteristic of the invention is that the lateral walls of the cover internally comprise flaps for collecting, and for redirecting towards the lateral faces of the cutting disc the cooling liquid which has been projected by the cutting disc during its rotation movement towards the curved perimeter wall, cooling liquid which has been previously projected against the cutting blade from the cooling liquid projecting nozzle. These flaps enable the liquid projected by the cutting disc against the curved perimeter wall of the shell to be reused to cool the cutting disc before said cooling liquid leaves the cavity of the shell; optimizing the use of said cooling liquid.

The fastening device could comprise guides contained within the cavity defining, together with said perimeter wall, a passage for housing the tube within the protective cover out of reach of the cutting disc. Said passage for housing the tube can be bigger than the tube, allowing the sliding movement of the tube along the passage.

Alternatively, the fastening device comprise first fasteners at least in an upper position in which a cooling liquid projecting nozzle with correspondent second fasteners attached to said first fastener placed in the upper position directs the cooling liquid towards an upper portion of the disc.

The fastening device can also comprise first fasteners at least in a lower position in which a cooling liquid projecting nozzle with correspondent second fasteners attached to said first fastener placed in the lower position directs the cooling liquid towards the edge of the cutting disc.

The attachments defined inside the cover are preferably distributed angularly between the upper and lower positions.

It is also proposed that the shell can be made of two independent parts, each part containing at least one lateral wall, being said two independent parts connected and articulated to each other through an articulation, allowing the opening of the shell and the access to the cavity. Said articulation that connects said two independent parts will be preferably rotatable around an axis parallel to a plane defined by the cutting disc.

The aforementioned characteristics and other characteristics of the invention described in the attached claims will be more easily understood in light of the exemplary embodiment shown by way of illustration and not limitation in the attached figures that are described below.

PREFERRED EMBODIMENT OF THE INVENTION

Figure 1:
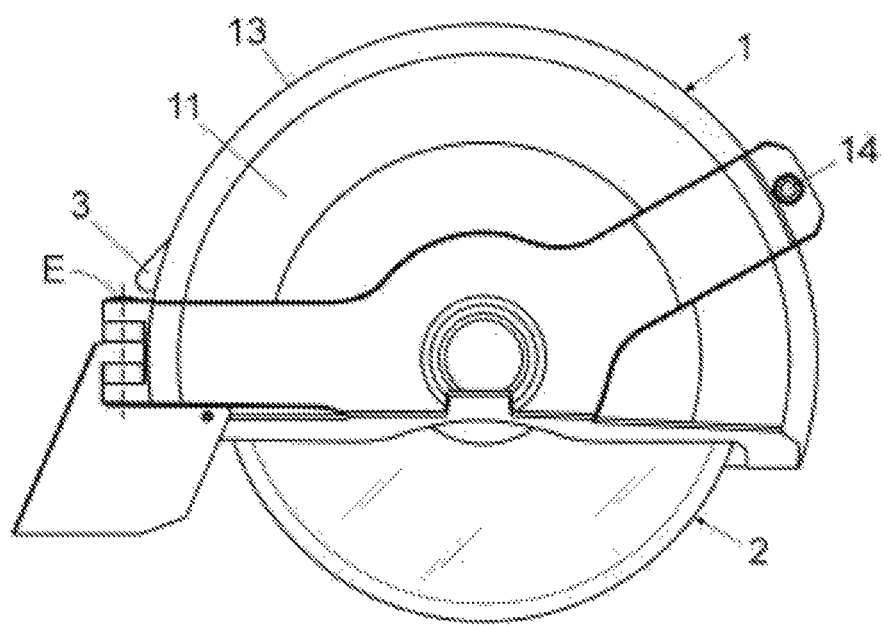
FIG. 1 shows a front elevation view of the protective cover with cooling for cutter discs.
Figure 2:
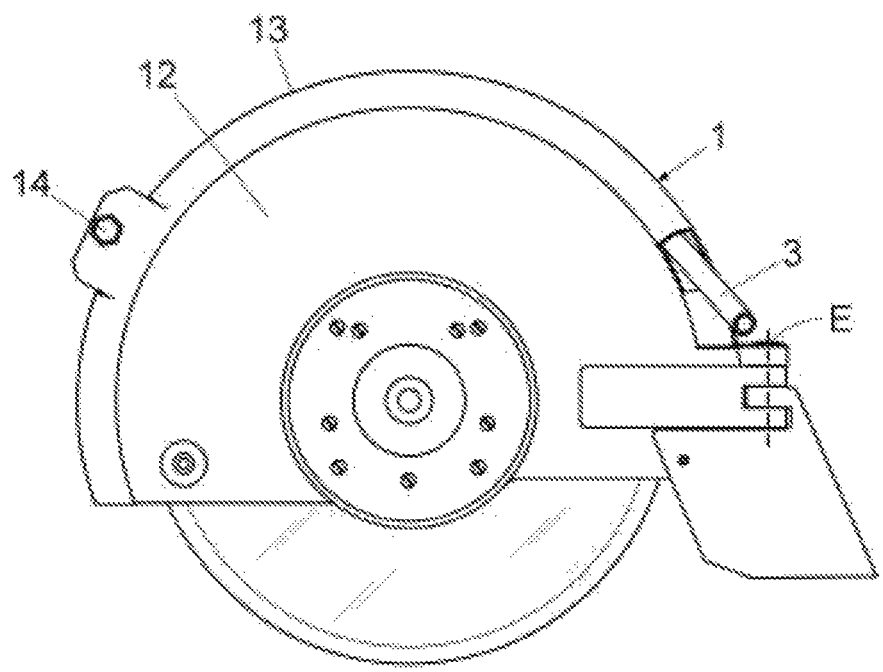
FIG. 2 shows a front elevation view of the protective cover with cooling for cutter discs.

In FIGS. 1 and 2, the protective cooling cover 1 for cutting discs is seen which comprises a rotatory circular cutting disc, a shell defined by two lateral walls 11, 12 provided with facing extensions that make up a curved perimeter wall 13 and a cooling device including a tube connected by one end to one cooling liquid projecting nozzle 31 and to a cooling liquid supply by the opposed end.

Said shell covers a portion of the cutting disc 2 at the top.

The shell is made by two independent parts, each including at feast one of said lateral walls 11, 12.

The independent parts are connected and articulated to each other via an articulation rotatable around a rotating shaft E that enables the cover 1 to be opened, and they are fixed in a closed position via a threaded element 14.

In the closed position, the shell defines an inner cavity 15 that internally comprises, in its periphery facing the edge of the cutting blade, a fastening device for fastening a portion of a cooling device housed within the shell.

The cooling device include a tube 3 connected on one end to a cooling liquid supply, and on the other end to a cooling liquid projection nozzle 31, being said cooling liquid projection nozzle 31 and a portion of the tube housed within the cavity of the shell, said tube exiting the cavity through a hole provided in the shell.

The fastening device include a plurality of first fasteners 17 connected to the inner periphery of the shell, out of reach of the cutting blade, for example following a path parallel to the curved perimeter wall 13, and a second fastener 32 connected to the cooling liquid projection nozzle 31. The first fasteners 17 and the second fastener 32 are complementary and connectable to each other providing a snap fit coupling.

Figure 3:
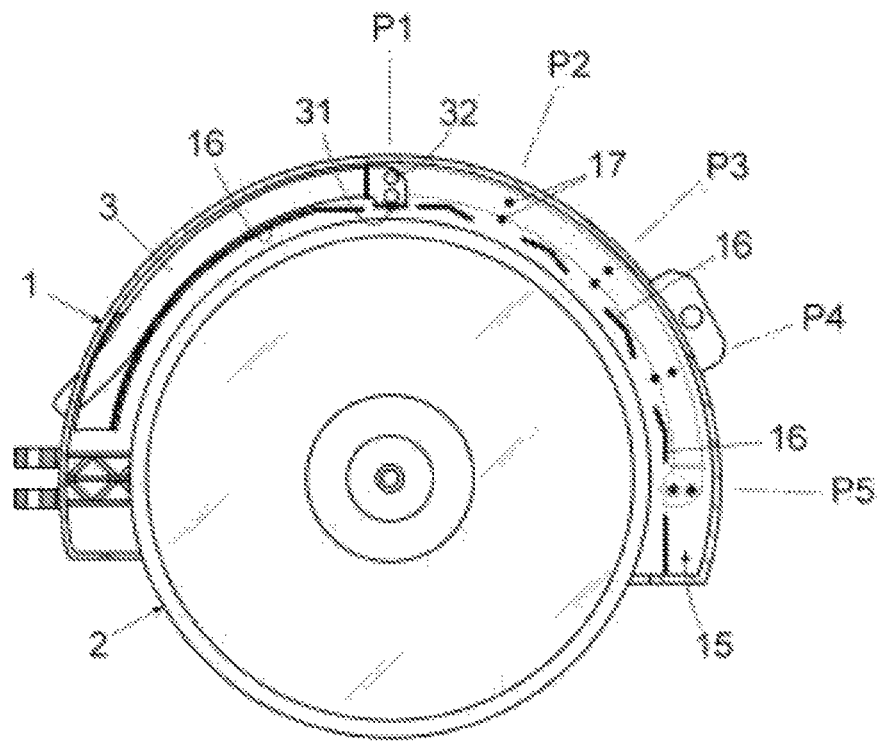
FIG. 3 shows a front elevation view of the protective cover, in which one of the lateral walls has been removed in order to allow a view of the tube and the cooling liquid supply nozzle, said nozzle being represented using solid lines in the upper position and dotted lines in a lower position.

Said first fasteners determine several positions P1, P2, P3, P4, P5 which are shown in FIG. 3 and in which the cooling liquid projection nozzle 31 can be attached through its second fastener 32. Said positions are comprised between: an upper position P1 in which the nozzle projects the liquid vertically on the upper end of the disc 2, and a lower position P5 in which the nozzle 31 projects the liquid directly, in this case horizontally, against the edge of the disc 2.

The intermediate positions P2, P3 and P4 are uniformly distributed between the upper and lower end positions P1, P5.

The fastening device includes guides 16 parallel to the curved perimeter wall 13 and that define, together with said perimeter wall 13, a passage for the tube housing 3.

Figure 4:
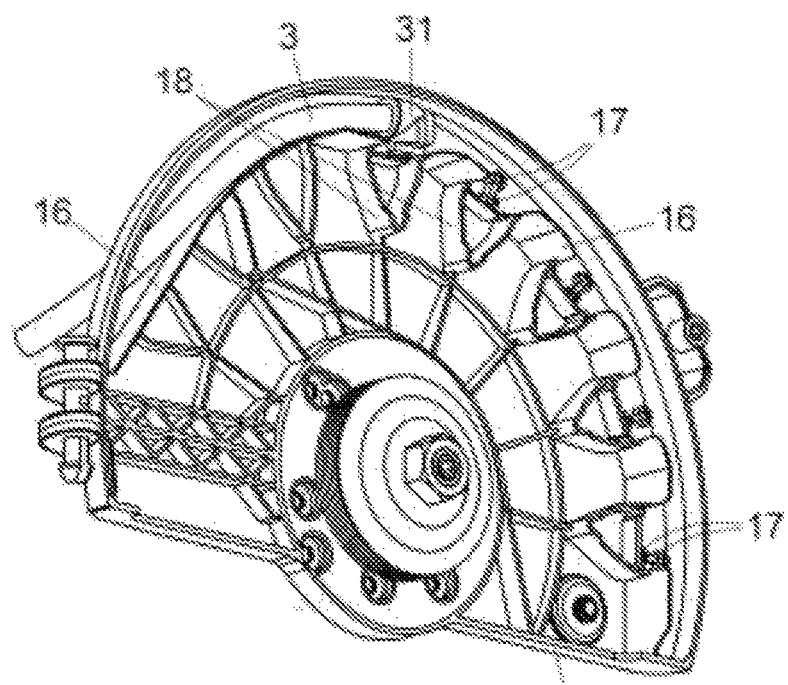
FIG. 4 shows a perspective view of one of the lateral walls of the cover seen from its inner face.
Figure 5:
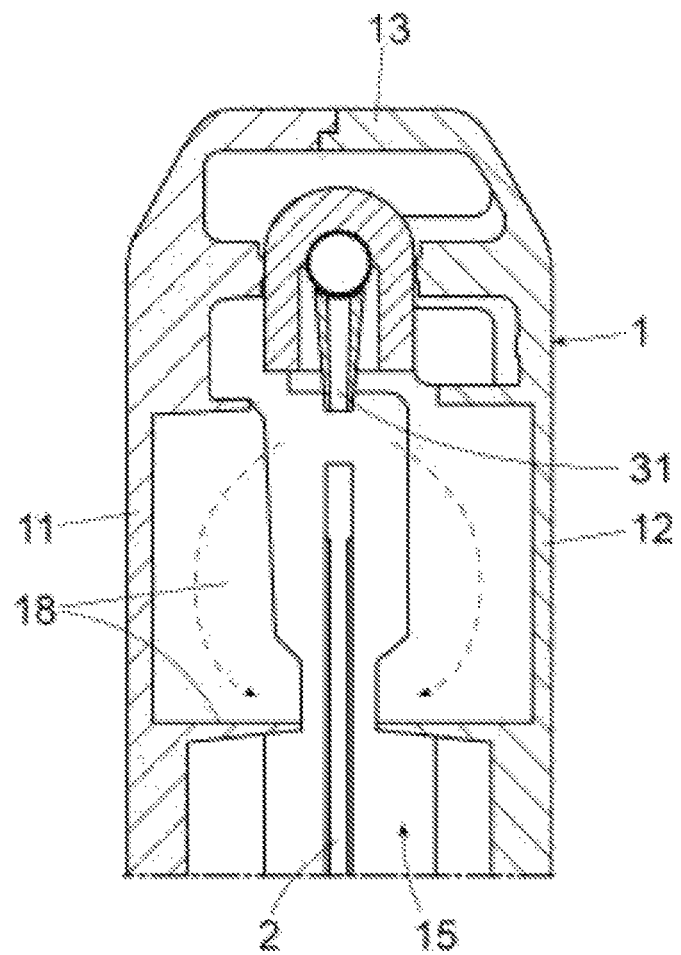
FIG. 5 shows a profile view of a vertical cross-section of an upper portion of the cover and the disc.

As seen in FIGS. 4 and 5, the lateral walls 11, 12 of the shell internally comprise flaps 18 for collecting, and for redirecting towards the lateral faces of the cutting disc 2 the liquid projected towards the curved perimeter wall 13 by the cutting disc 2 during its rotation movement due to the centrifugal force.

Having sufficiently described the nature of the invention, in addition to a preferred exemplary embodiment, it is hereby stated for the relevant purposes that the materials, shape, size and layout of the described elements may be modified, provided that it does not imply altering the essential characteristics of the invention claimed below,

The invention claimed is:

1. A protective cooling cover for a cutter disc rotative around a cuter disc axis, said cutter disc having a top upper portion and an edge, wherein said protective cooling cover comprises:
    a shell defining a generally semi-cylindrical cavity that covers said top upper portion of the cutter disc and is delimited by two lateral walls and a curved perimeter wall;
    a cooling device including a tube, connectable to a cooling liquid supply supplying a cooling liquid, and connected to a cooling liquid projecting nozzle;
    a fastening device including a plurality of first fasteners connected to the lateral walls and/or to the curved perimeter wall and comprised within said cavity, in different positions around a periphery of the cavity, and at least one second fastener connected to the cooling liquid projecting nozzle, said second fastener being complementary and attachable to any of the first fasteners, being the cooling liquid projecting nozzle fixable in any of said different positions around the periphery of the cavity directing the cooling liquid projecting nozzle towards the cutter disc.

2. The protective cooling cover, according to claim 1, wherein the lateral walls of the protective cooling cover internally comprise flaps for collecting and redirecting towards the lateral faces of the cutter disc the cooling liquid which has been previously projected by the cooling liquid projecting nozzle towards the cutter disc and which is now projected by the rotation of the cutter disc towards the curved perimeter wall.

3. The protective cooling cover, according to claim 1, wherein the fastening device comprise guides contained within the cavity that define, together with said perimeter wall, a passage for housing the tube within the protective cover, out of reach of the cutter disc.

4. The protective cooling cover, according to claim 3, wherein the passage for housing the tube is bigger than the tube, allowing a sliding movement of the tube along the passage.

5. The protective cooling cover, according to claim 1, wherein the fastening device comprise at least one of the plurality of first fasteners in an upper position in which the cooling liquid projecting nozzle with the correspondent at least one second fastener attached to said at least one first fastener placed in the upper position directs the cooling liquid towards an upper portion of the cutter disc.

6. The protective cooling cover, according to claim 5, wherein the fastening device comprise at least one of the plurality of first fasteners in a lower position in which the cooling liquid projecting nozzle with the correspondent at least one second fastener attached to said at least one first fastener placed in the lower position directs the cooling liquid towards the edge of the cutter disc.

7. The protective cooling cover, according to claim 6, wherein the plurality of first fasteners defined inside the cover are distributed angularly between the upper and lower positions.

8. The protective cooling cover, according to claim 1, wherein the shell is made of two independent parts, each part containing at least one lateral wall, being said two independent parts connected and articulated to each other through an articulation rotatable around a rotating shaft, allowing the opening of the shell and the access to the cavity.

9. The protective cooling cover, according to claim 8, wherein the rotating shaft around which the articulation that connects said two independent parts is rotatable is parallel to a plane defined by said lateral walls of the cover.

* * * * *